Figure 1:
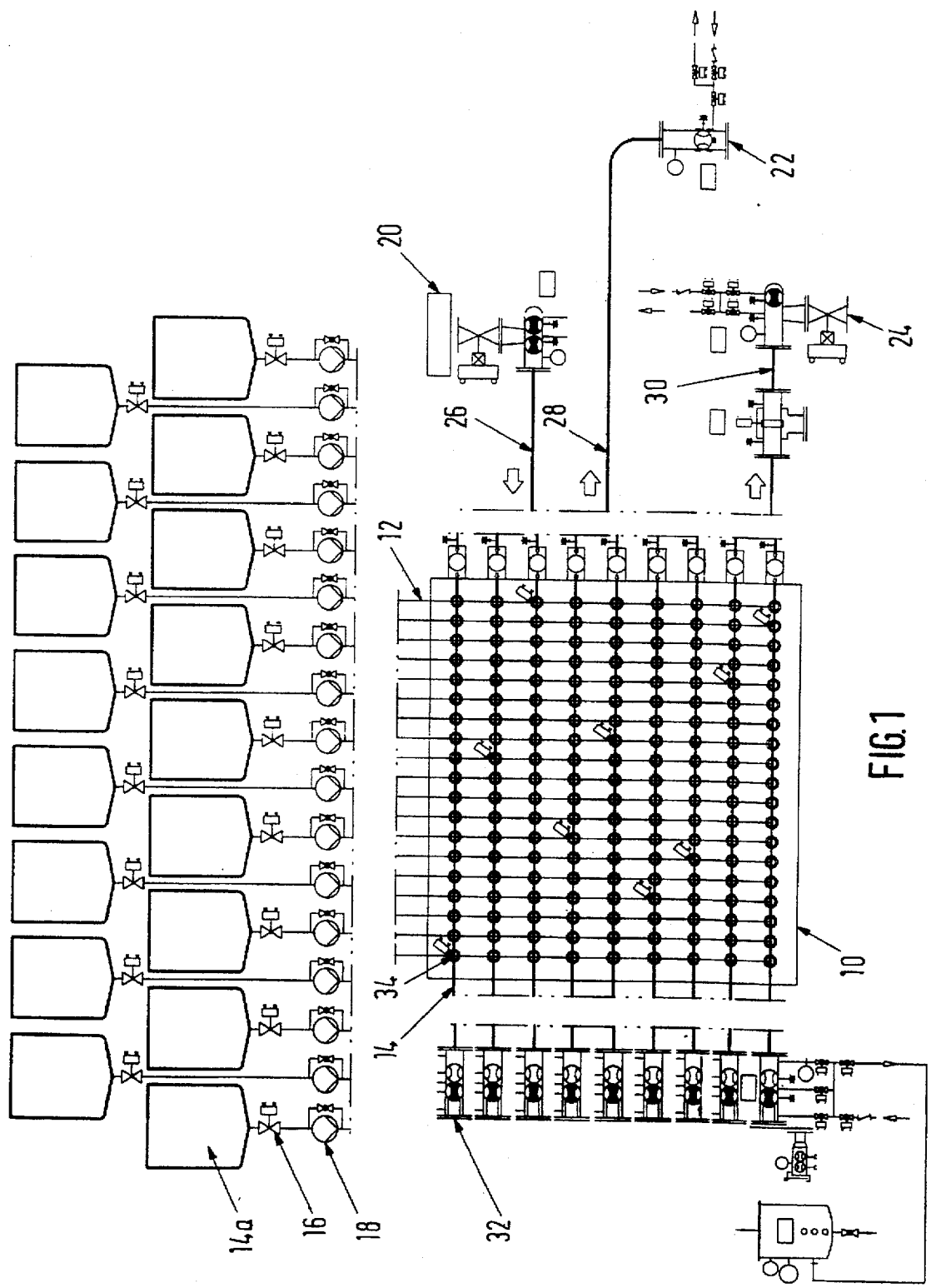

United States Patent [19]
Skibowski et al.

[11] Patent Number: 5,690,140
[45] Date of Patent: Nov. 25, 1997

[54] DISTRIBUTION ASSEMBLY FOR THE SELECTIVE CONNECTION OF FLUID LINES OF A FIRST GROUP OF LINES WITH FLUID LINES OF A SECOND GROUP OF LINES

[76] Inventors: Martin Skibowski, Blomeweg 20, D-22147 Hamburg; Michael Jakubik, Hüllenkamp 146, D-22149 Hamburg, both of Germany

[21] Appl. No.: 707,371

[22] Filed: Sep. 4, 1996

[30] Foreign Application Priority Data

Sep. 7, 1995 [DE] Germany ............ 195 32 942.2

[51] Int. Cl.⁶ .................................... F17D 3/00
[52] U.S. Cl. ............................ 137/597; 137/636
[58] Field of Search ................... 137/597, 636; 251/327

[56] References Cited

U.S. PATENT DOCUMENTS

| | | | |
|---|---|---|---|
| 1,733,897 | 10/1929 | McNeil | 137/597 |
| 3,195,726 | 7/1965 | Saureman | 137/597 |
| 3,382,890 | 5/1968 | Howland | 137/870 |
| 3,744,376 | 7/1973 | Carpenter | 137/597 |
| 4,367,766 | 1/1983 | Uomala | 251/327 |
| 4,566,492 | 1/1986 | Bessard | 137/636 |
| 5,275,201 | 1/1994 | Zimmerly | 137/597 |
| 5,390,694 | 2/1995 | Zimmerly | 137/597 |
| 5,469,880 | 11/1995 | Zimmerly | 137/597 |

FOREIGN PATENT DOCUMENTS

| | | | |
|---|---|---|---|
| 1102359 | 10/1955 | France | 137/597 |
| 2133116 | 7/1971 | Germany | 137/597 |

*Primary Examiner*—Denise L. Ferensic
*Assistant Examiner*—Ramyar M. Farid
*Attorney, Agent, or Firm*—Faegre & Benson

[57] ABSTRACT

A distribution assembly for the selective connection of fluid lines of a first group of lines with fluid lines of a second group of lines, characterized by the following features: First stationary ducts are connected to the lines of the first group of lines. Second stationary ducts are connected to the lines of the second group of lines, the ducts having a cross section adapted to be cleaned by a line scraper, the ducts further intersecting the first ducts, with an intersecting portion leaving a passage within the first ducts for the flow of a fluid in the first duct. A shutoff valve for each set intersecting portions of the second ducts is located within the first duct, the valve having a valve member which selectively shuts off or opens a connection between the intersecting portion and a first duct, the valve member being connected to an actuating member which extends outwardly of the first duct, and an actuator for the actuating member.

8 Claims, 3 Drawing Sheets

DISTRIBUTION ASSEMBLY FOR THE SELECTIVE CONNECTION OF FLUID LINES OF A FIRST GROUP OF LINES WITH FLUID LINES OF A SECOND GROUP OF LINES

The invention refers to a distribution assembly for the selective connection of fluid lines of a first group of lines with fluid lines of a second group of lines.

The British patent specification 1 566 599 discloses to interconnect S-shaped pipes between the ends of the fluid lines of a first group of lines and the end of the fluid lines of a second group of lines for a selective connection of the lines. Such a distribution assembly is expensive and space-consuming. Further it can occur that a wrong connection is made so that the product can escape in the environment.

The French patent publication 1 566 884 discloses a distribution assembly wherein first duct portions and second duct portions are formed at parts of plates. Externally mounted valve means serve for the connection of the individual duct portions. Such a distribution assembly cannot be cleaned by pipe scrapers or the like. In many cases such capability of being scraped is required.

The German patent publication 32 10 558 discloses a distribution assembly wherein a plurality of male coupling portions are located stationary, with the adjacent stationary coupling parts being equally spaced. The front surfaces of the coupling parts lie in the same plane. Two female coupling parts are provided at the end of a 180° pipe bend and have a distance from each other corresponding to the space between adjacent male coupling parts. With such distribution device normally only two lines can be interconnected.

The European patent publication 0 254 764 discloses a distribution assembly wherein each of first and second lines include a movable connection line which has a connection head at the free end thereof. The connection heads of the first lines can be moved along parallel first axes by means of a first guide means, and the connection heads of the second lines can be moved along parallel second axes by means of a second guide means. The connection heads include angled end portions which retain female and male coupling parts, respectively, having front surfaces which all lie in a common coupling plane. Such a distribution device can be completely cleaned by a pipe scraper, however, needs a lot of space. This is caused by the fact that for a connection of the lines of the first and the second group of lines the movable connection line is to be used. Also in this case the danger exists that a wrong connection cannot be avoided.

It is an object of the invention to provide a distribution assembly for the selective connection of lines of a first group of lines with the lines of a second group of lines which has small overall dimensions, defines a closed system and allows the cleaning by a scraper for the lines of at least one group of lines.

The distribution assembly according to the invention provides first stationary ducts which are connected to the lines of the first group of lines. These lines for example can be connected to tanks of a group of tanks. Since the first stationary ducts cannot be cleaned by pipe scrapers, they are preferably located near to the tanks or to reservoirs with the contents thereof to be conveyed to the lines of the second group of lines. The second stationary ducts, however, can be cleaned by scrapers and thus for example have circular cross section. These ducts are connected to the second group of lines which for example is connected to filling assemblies, mixing devices or the like. The second ducts intersect or penetrate the first ducts, with the latter still having a through-going flow passage. Preferably, these first ducts are operated by a so-called full system, i.e. the ducts are completely filled and are continuously connected to the supply source, that is either under the static pressure thereof or by the pressure of suitable pumps.

Each intersecting portion of the second ducts within the first ducts is provided with a shutoff valve. The shutoff valve includes a valve member which selectively establishes a connection of the interior of the intersecting portion with the first duct or shutoff such connection. The valve member is operably connected with an actuating member which is extended beyond the first duct in order to be actuated by a suitable actuation means. The actuation means is connected to a suitable control means which controls which actuating member is to be actuated in order to establish the selective connection of one of the lines of the first group of lines with one of the lines of the second group of lines. Also a plurality of lines of the first group of lines can be connected with a plurality of lines of the second group of lines.

The distribution assembly according to the invention has a lot of advantages. It is a closed system which does not release product to the environment due to a malfunction. In case the valve members of the shutoff valves do not work satisfactorily undesired interconnections and flow of products may occur, however, a detrimental influence of the environment does not take place.

The distribution assembly according to the invention needs small space. The first ducts can be located immediately side by side so that the second ducts are substantially defined by the intersecting portions. Furthermore, the distribution assembly according to the invention can be simply enlarged as much as possible. Additional lines of the second group of lines can be connected by an extension of the first ducts. By increasing the number of first ducts, an increased number of lines of the first group of lines can be connected.

The distribution assembly according to the invention has the further advantage that it can be cleaned by scrapers in view of the second ducts up to their connection points. In many cases where a scrapable system is provided this is completely sufficient. It has been explained more above that it can be appropriate to locate the distribution assembly relative near to the reservoirs for liquid products. On the other hand, it can be also appropriate to locate the distribution assembly near to an application area for the products, e.g. filling machines, mixing devices or the like. In this case the connection lines to the reservoirs can be cleaned by scrapers, e.g. the tank lines from the tanks in a group of tanks.

The distribution assembly according to the invention can be operated automatically or manually. The automatic control needs a small expense.

Finally, the distribution assembly according to the invention enables a mixing and the conveyance of liquids from one tank to the other when the valves are controlled correspondingly.

The first ducts of the distribution assembly according to the invention can be arranged in a block or the like which is intersected by the second ducts. However, it is advantageous if the first ducts are formed by first tubes having two parallel wall portions facing the second ducts, e.g. tubes with an oblong square cross section. Such profile tubes can be made by casting or extruding and are commercially available.

The valves for the intersecting portions in the first ducts can be known valves, e.g. a wedge-like or sleeve-like sluige gate or a ball valve. According to an embodiment of the invention the valve member is an annularly shaped valve member which in its closing position defines a passage which is registring with the flow cross section and shuts off a lateral outlet of the second duct and which in the opened position is radially displaced relative to the second duct and opens a passage to the lateral outlet. Such a valve member has become known by the German patent publication 32 10 561. It serves for the selective closing of a T-shaped tube branch which is to be completely cleaned by a scraper without leaving residual liquid. An annular valve member of this kind has the further advantage that it can serve as stop means for the scraper when it is completely or partially displaced in the opening position. Preferably sealing means are provided at both front surfaces of the annular valve member.

According to another embodiment of the invention, the intersecting portion is formed by two tube pieces which are inserted at opposing sides in the first duct. The ends of the tube pieces form a gap adapted to accommodate the valve member, e.g. an annular valve member, to be sealingly displaceable therebetween.

If the intersecting portions extend a small extent outwardly of the first ducts, the intersecting portion of the first ducts can be pressed against each other transverse to the longitudinal direction thereof so that the protruding portions of the intersecting portions are in a sealing abutment. It is understood that such a package can be enlarged in that a further duct with corresponding intersecting portions is used which is pressed against the existing package in the manner described.

It can be conceived to mount the actuating members, e.g. actuating shafts or rods separately on suitable actuation means. According to an embodiment of the invention it is preferred to mount the actuating members on the first ducts. If the actuating members for a second duct are arranged in a row, only one actuation means is to be used per row which actuation means can be displaced along the row by suitable driving means. The expense for such an actuation is drastically reduced. The actuating member can be for example an actuating rod biased by a spring which rod is actuated by a cylinder, when the cylinder is aligned with the actuating rod by suitable conveying means. These conveying means can be defined by a suitable linear drive, e.g. a cogged belt in order to make the alignment of the actuation means, e.g. an actuation cylinder with the actuating rod. To this purpose each actuating rod can include a guiding portion, and the actuation cylinder includes a slide which co-operates with the guiding portions. In order to achieve a satisfactory guidance it may be preferred to provide the slide with a length that it engages also adjacent guiding portions.

Figure 2:
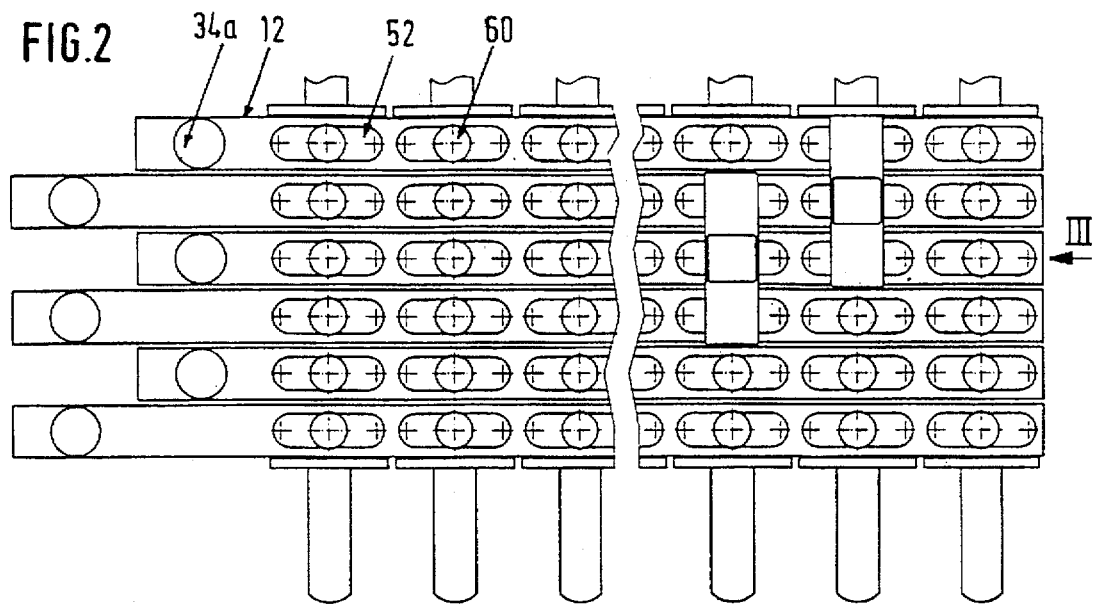
Figure 3:
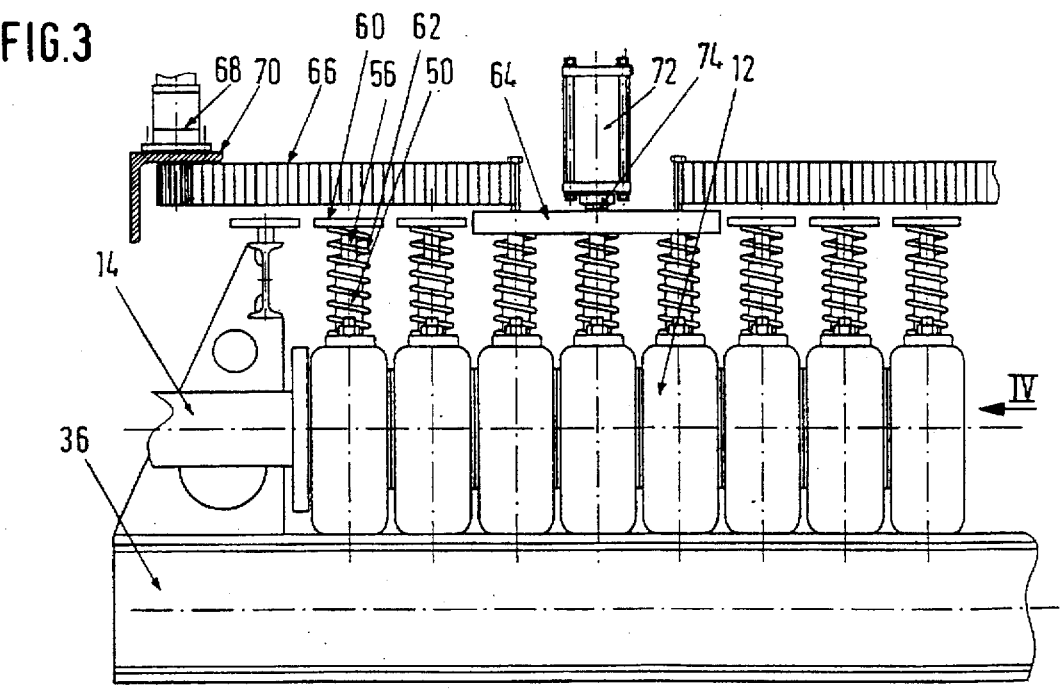
Figure 4:
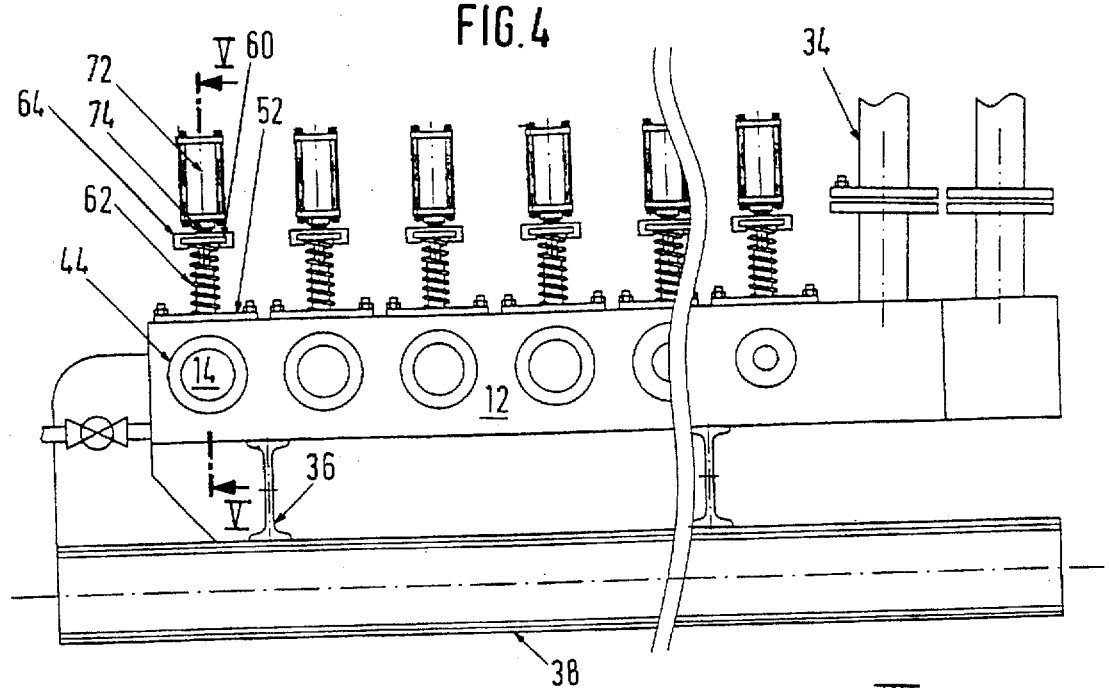
Figures 5, 6:
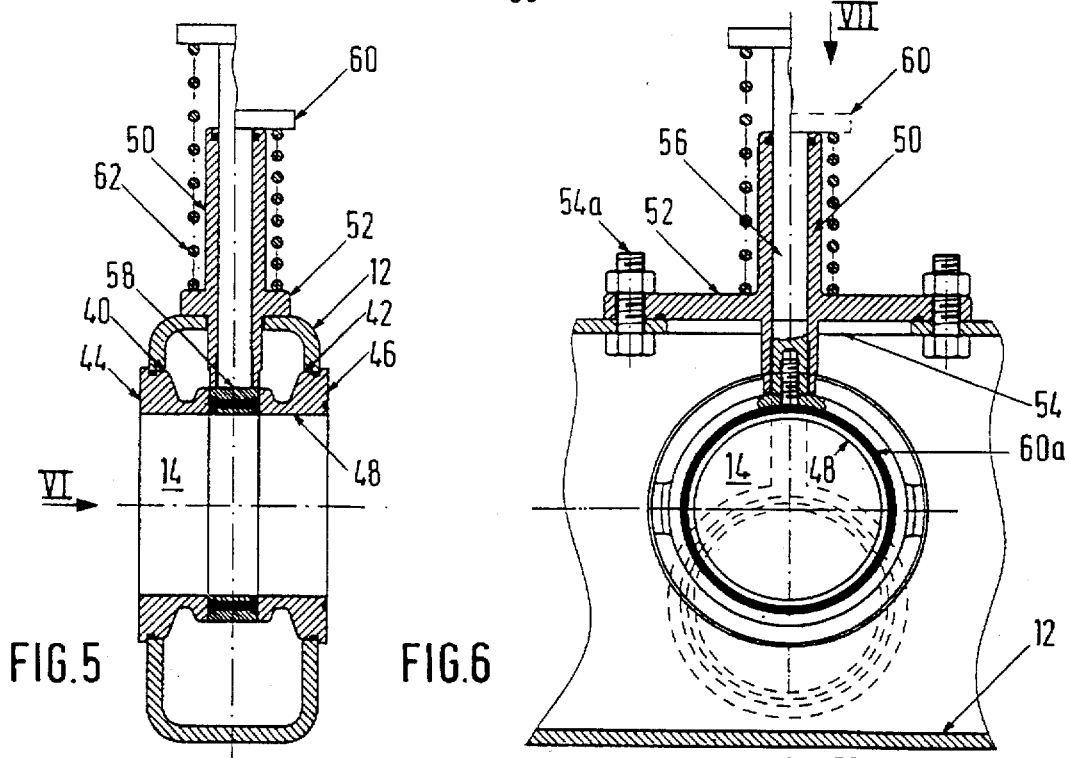

An embodiment example of the invention is subsequently described along accompanying drawings, wherein FIG. 1 is a schematic view of the distribution assembly according to the invention for a first and a second group of lines, FIG. 2 shows a plan view of the first ducts of the distribution assembly of FIG. 1, FIG. 3 shows the view of the duct assembly of FIG. 2 in direction of arrow 3, FIG. 4 shows a view of the assembly of FIG. 3 in the direction of arrow 4, FIG. 5 shows a cross section through the assembly of FIG. 4 along line 5—5.

Figure 7:
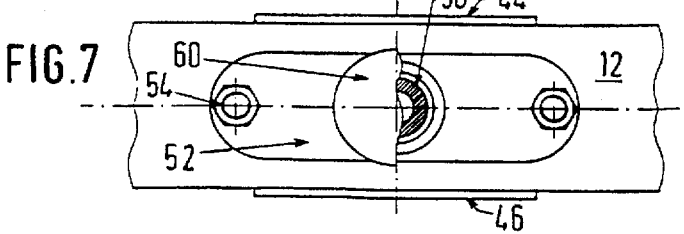

FIG. 6 shows the lateral view of the assembly of FIG. 5 in direction of arrow 6, and FIG. 7 shows a plan view of the assembly of FIG. 6 in the direction of arrow 7.

In FIG. 1 a matrix-shaped distribution assembly 10 is indicated comprising first ducts 12 which are arranged in the columns of the matrix and second ducts 14 arranged in the lines of the matrix. Each duct 12 is connected to one of the tanks 14a through a valve 16 and a pump 18. The ducts 12 are operated in full system operation, i.e. are continuously filled with the product of the associated tank 14a. The ducts 14 are connected to apparatuses or containers into which the product is to be conveyed from the tanks. A mixing device is indicated at 20 and a filling machine is connected at 22 and 24. The connection takes place through lines 26, 28 and 30 which may have a considerable length. The ducts 12, however, are located near a field of tanks. The ducts 14 and the lines 26 to 30 can be operated by a scraper. Scraper catching and transmitting stations are provided at opposing ends of ducts 14. These are not explained in more detail.

At the intersection points 34 of ducts 12 and 14 valves are arranged which can be controlled remotely or actuated manually. By means of the valves any duct 12 can be connected to any duct 14. This is explained in more detail along the other Figures.

As can be seen in the FIGS. 2, 3 and 5, the ducts 12 have a rectangular profile. They are arranged closely together and extend in parallel to each other (FIG. 2). The ducts 12 can be connected to the tanks as indicated at 34a. The ducts 12 are supported through double T profiles 36 which in turn are supported on a frame 38 or the assembly 10. At the opposing plane sides of the ducts 12 openings 40, 42 are formed into which pieces 44 or 46, respectively, of tubes are sealingly inserted. At the facing inner ends the tube pieces 44, 46 are spaced. As can be seen in FIG. 3, the first ducts 12 are arranged so close together that the facing tube pieces 44, 46 abut each other and form a passage 48 which extends transverse through all ducts 12. The ducts 12 can be pressed together to a package by suitable measures (not shown). The passage 48 has a uniform cross section and is therefore adapted to be cleaned by a scraper. In this manner the second ducts 14 are formed which penetrate or intersect the first ducts 12. As can be seen in FIG. 4, the diameter of the second ducts 14 can vary.

A sleeve-like guide 15 is located above each intersection point of the ducts 14 and attached by an elongated flange 42 which in turn is attached to duct 12 through threaded fasteners 54a. In this area duct 12 has an opening 54, a portion of guide 50 extending through the opening 54 into duct 12. An actuating member 56 defined by a rod is displaceably supported by the guide 50 and retains an annular valve member 58 at the lower end thereof. The annular valve member has annular sealings on opposing front surfaces as indicated at 60a in FIG. 6. The annular valve member 58 can be moved slidingly and sealingly in the gap between the tube pieces 44, 48. The inner diameter of the annular valve member 58 corresponds to that of the tube pieces 44, 46 of passage 48. In FIG. 5 the annular valve member 58 is shown in a closed position. In FIG. 6 the opened position is indicated by dotted lines. In the opened position a connection between ducts 12, 14 is established through the nearly completely free gap. A guiding plate 60 is connected to the upper free end of rods 56, a spring 62 being arranged between the guiding plate 60 and flange 52. The annular valve member 58, thus, is biased into its closed position.

As can be seen in FIG. 2, the guide plates 60 of a duct 12 are arranged in a row. The guide plates 60 in a direction transverse to this row are also located in a row. To each of the latter rows a guide slide 64 is associated having a U-shaped cross section, the slide 64 co-operating with the guide plates 60. Slide 64 is suspended on a clogged belt 66 which is driven by a suitable driving motor 68 located on a suitable support means 70. The length of slide 64 is such that each three adjacent guide plates 60 can be accommodated (FIG. 3). Each slide 64 supports actuation means defined by an actuation cylinder 72, with the piston rod 74 thereof extending through an opening (not shown) in the web of slide 64 for the actuation of the rod if cylinder 62 is aligned to a respective rod. In this manner the individual valves or annular valve members 58, respectively, in the crossing points 34 of the distribution matrix can be actuated.

It can be seen that each of the first ducts 12 can be connected to each of the ducts 14. The distribution system described is closed or sealed so that the product cannot escape due to a malfunction. The ducts 14 can be cleaned by a scraper desired in many applications. In the opened position the annular valve members 58 can serve as scraper catching devices (FIG. 6). As can be simply seen further, the number of first and second ducts 12, 14 can be arbitrarily enlarged. For instance, further ducts 12 can be provided or extended to a greater length.

As can be seen further, the distribution assembly allows an interconnection of tanks 14a and to fill up the tanks through the second ducts 14.

We claim:

1. A distribution assembly for the selective connection of fluid lines of a first group of lines with fluid lines of a second group of lines, characterized by the following features:

first stationary ducts (12) connected to said lines of said first group of lines;

second stationary ducts (14) connected to said lines of said second group of lines, said second ducts having a constant cross section along their length and configured to be cleaned by a line scraper, said second ducts intersecting said first ducts, with an intersecting portion leaving a passage within each of said first ducts for the flow of a fluid in to and from said second ducts;

a shutoff valve for each said intersecting portion of said second ducts (14) located within a respective one of said first ducts (12), said valve having a valve member which selectively shuts off and opens a fluid connection between each said intersecting portion and a selected one of said first ducts (12), said valve member being connected to an actuating member (56) which extends outwardly of said first ducts;

actuation means (72) for said actuating member (56);

wherein said first ducts (12) are defined by first tubes having opposing wall portions facing said second ducts (14) and wherein said valve member has a cross section substantially identical to the cross section of the second ducts to form a passage aligned with said second ducts (14), said valve member being radially displaceable relative to said second ducts (14) to form a lateral outlet with respect thereto and projecting into said first ducts in an open position thereof to open said lateral outlet;

wherein said intersecting portion is formed by two tube pieces (44, 46) which are inserted into said first ducts (12), said tube pieces forming a gap therebetween, and said valve member (48) being sealingly displaceable within said gap; and wherein each said intersecting portion (44, 46) projects a small extent beyond said first ducts, and said first ducts (12) are pressed against each other transverse to a longitudinal direction thereof, so that said intersecting portions (44, 46) sealingly abut each other.

2. The assembly of claim 1, wherein said first tubes have an oblong rectangular cross section.

3. The assembly of claim 1, wherein sealing means are located on a pair of surfaces of said value member (58).

4. The assembly of claim 1, wherein said actuating member (56) is mounted on said first ducts (12).

5. The assembly of claim 4, wherein said actuation member (56) for said second ducts (14) is located in a row, and said actuation means (72) are provided for each row and can be moved along the row through driving means (66, 68).

6. The assembly of claim 5, wherein the actuating member include a spring-biased actuating rod (56), and said actuation means (72) is defined by an actuating cylinder.

7. The assembly of claim 6, wherein said actuating rod has a guide portion (60) co-operating with a guide slide (64) to which said actuation cylinder is connected.

8. The assembly of claim 7, wherein said slide (64) has a length so that it co-operates with a group of three adjacent guide portions.

* * * * *

UNITED STATES PATENT AND TRADEMARK OFFICE
CERTIFICATE OF CORRECTION

PATENT NO. : 5,690,140
DATED : Nov 25, 1997
INVENTOR(S) : Skibowski, et al.

It is certified that error appears in the above-identified patent and that said Letters Patent is hereby corrected as shown below:

Claim 6, column 6, line 34, delete "include" and insert therefor -- includes --.

Signed and Sealed this

Seventeenth Day of March, 1998

Attest:

BRUCE LEHMAN

Attesting Officer

Commissioner of Patents and Trademarks